Figure 1:
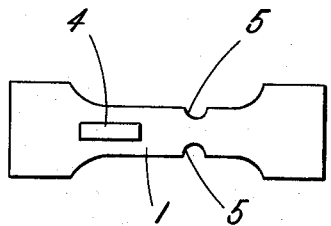

Jan. 12, 1960     T. HAAS     2,920,480
METHODS FOR INDICATING THE EXPIRATION OF THE ASSIGNED
OR SAFE LIFE OF STRUCTURAL MEMBERS
Filed Jan. 14, 1957

United States Patent Office 2,920,480
Patented Jan. 12, 1960

2,920,480

METHODS FOR INDICATING THE EXPIRATION OF THE ASSIGNED OR SAFE LIFE OF STRUCTURAL MEMBERS

Tibor Haas, Bristol, England

Application January 14, 1957, Serial No. 633,982

Claims priority, application Great Britain January 18, 1956

7 Claims. (Cl. 73—88)

This invention comprises improvements in methods for indicating the expiration of the assigned or safe life of structural members.

It is well known that structural members subjected to a variable-stress regime are liable to failure at quite low stress ratings compared with their ultimate strengths under static loading, this phenomenon being known as fatigue. A number of proposals have been made for devices to indicate when the assigned or safe life of such a structural member has been expended, but none of these proposals fully meets the requirements of practice.

One known method is to use a counting accelerometer with a view to assessing the cumulative damage to structural members due to the stresses expected to arise from the accelerations recorded. Due to dynamic overshoot discrepancies occur between the "acceleration history" recorded and the "strain history" of various parts of the structure, so that considerable technical skill is required to obtain reliable deductions from the data recorded.

Another method involves the use of an instrument known as a strain range counter to totalise the number of times strains of selected severities occur in the member under supervision. In this way a close check can be kept on the progress of fatigue damage, but the instrument is necessarily of delicate construction and of substantial bulk so that difficulties arise in applying it to some members to be supervised and there are considerable risks of malfunctioning or breakages and mishandling, all of which throw doubt upon the reliability of the information recorded.

A fatigue damage indicator is also known comprising a sensing element which is associated with the member to be supervised in such a way as to be strained equally with it, the sensing element being submitted before association with the member to a constant amplitude cyclic stress regime calculated to reduce its life to failure to a length equal to the assigned or safe life of the member to be supervised. In this method the required amount of pre-damage is assessed by application of the cumulative damage rule propounded by Miner in 1945 (see Journal of Applied Mechanics, vol. 12 September 1945 P.A. 159) which is based on the assumption that, within certain stress limits, the total work done upon the member to failure is constant and independent of the stress levels at which it is accomplished. The cumulative damage rule takes no account of the sequence in time of stress cycles of varying amplitude, although it is now a well known fact that the effect of varying sequence is by no means negligible. In fact variations of several hundred percent in work done to failure of specimens can be demonstrated.

A fatigue damage indicator employing a single sensing element is furthermore incapable of taking into account the phenomenon known as "scatter," according to which apparently identical specimens show markedly different endurance lives.

According to a still further proposal several sensing elements are used which are subjected to inertia-induced stresses excited by the accelerations accompanying the stressing of the member to be supervised. The several sensing elements are notched to produce different values of stress concentration, the aim being to reduce the life of the most severely notched element to equal the safe life of the member to be supervised. It will be appreciated that in this method experimental calibration must be relied upon to offset differences in the strain histories of the member and the sensing elements and to provide such compensation as may be possible for inconsistencies in the damage rates at the different stress levels experienced by the member and the sensing elements. The proposal furthermore takes no account of the phenomenon of scatter. In fact a sensing element of low stress concentration, intended to give warning of imminent ending of the safe life of the structure will in some cases fail before elements of high stress concentration intended to indicate only the elapse of certain fractions of the safe life and thus discredit the device.

The fatigue life of a structural member, which term is herein intended to include a jointed assembly of members, is dependent not only on the character of the working stress regime but also upon the composition and configuration of the member and upon its physical characteristics, by which is meant its surface finish and internal structure, as influenced for example by heat and mechanical treatments. The object of the present invention is to provide a method of indicating fatigue damage which will take account of all these factors, but before proceeding to a statement of the nature of the invention it is necessary to elucidate certain terms required for its definition.

One line of development of the art of fatigue testing follows from a proposal initiated by Gassner in 1939 (see "buftwissen" vol. 6, 1939, pages 61–64) and is concerned with the analysis of the variable stress regime to which a structural member is subjected (the service stress regime) and to the planning of a testing regime (the "equivalent" testing regime) giving in a shorter elapsed time equivalent numbers of well mixed stress cycles of the different amplitudes found in the service stress regime. In general, a service stress regime comprises a large number of stress cycles of different amplitude in random arrangement. Although the arrangement does not repeat itself cyclically, if sufficiently long periods are analysed, for example by means of a strain range counter, they will be found to comprise similar proportions of small, medium and large amplitude stress cycles. Such an analysis is conveniently described as the "spectrum" of the regime.

Experimental observation indicates that the nature and extent of fatigue damage done to a specimen varies with the amplitude of the stress cycles, with the number of consecutive cycles of the same amplitude and with the temporal arrangement of cycles of different amplitudes. In illustration of this, three principal cases can be distinguished. In case 1 the submission of the specimen initially to a few cycles of very high stress, known as pre-stressing, gives at stresses which are lower than the initial stress but are above the lowest stress at which failure will occur in a finite number of cycles, known as the fatigue limit stress, endurances which are superior to those indicated by the cumulative damage rule. In case 2 the submission of the specimen initially to a large number of stress cycles below the fatigue limit, known as understressing, gives improved endurance, relatively to the indications of the cumulative damage rule, at stress levels above the fatigue limit. In case 3 the submission of the specimen initially to a number of cycles at a stress level above the fatigue limit gives varying endurance, relatively to the indications of the cumulative damage rule, at stress levels above the level of the initial stress cycles.

Since the service regime is random in character there is obviously no possibility of testing specimens with a regime identical with the service regime, but it has been established that by employing a testing regime which is cyclic (i.e. repetitive) in character, each cycle having a similar spectrum to that of the service regime, and the cycles repeating upwards of twenty times during the life of a specimen, that failures under test are remarkably similar to failures in service, which is not often the case when tests are carried out with constant amplitude stress cycles. Furthermore, whereas with constant amplitude stress cycle testing the scatter of results tends to be greater than that observed with members in service, with an "equivalent" testing regime of the kind described the scatter of results is not greater than, and often less than, that of members failing in service. Naturally the smaller the scatter, which also varies with the material of which the specimen is composed, the smaller the number of specimens which must be tested to ensure adequate exploration of the scatter range. Nine specimens are regarded as sufficient for most purposes.

By submitting the selected number of specimens to the equivalent testing regime until failure it is thus possible to establish that the mean life of the specimens is a certain number of test cycles. The mean expectation of life of similar members in service is then approximately that duration of the service regime which comprises the same numbers of stress cycles of each amplitude as the equivalent testing regime. Some variation from the exact numerical equivalence of the numbers of stress cycles is to be expected depending upon the accuracy of the matching of the spectra of the service and testing regimes and idiosyncrasies of testing machines used. In practice, especially in aircraft construction where the penalty of increased weight is very great, a safe life is assigned to the member which is sufficiently below the mean expectation of life to reduce the probability of failure to a small value comparable with other risks which are necessarily run concurrently. Thus the assigned or safe life extends into the scatter range of possible failure of the member and the desirability of having warning of the expiration of the assigned or safe life is evident, since the risk of failure increases at an increasing rate as the scatter range is penetrated. Moreover the more accurately the expiration of the assigned or safe life can be measured the further within the scatter range is it permissible to extend the assigned or safe life, and thus increase the useful life of the structure.

According to the present invention a method of providing an indication of the expiration of the assigned or safe life of a structural member comprises providing in association with the structural member in such a way as to be equally strained therewith, a sufficient number of identical sensing elements to cover adequately the pre-established scatter of endurances to failure of such sensing elements when subjected to a testing stress regime "equivalent" to a service stress regime applicable to the structure of which the member forms a part, said sensing elements being:

(a) of insufficient total load-carrying capacity to reduce appreciably the working stresses in the structural member, (b) of such composition, configuration and physical characteristics as to have at an initial stage before association with the structural member a mean expectation of life substantially equal to the mean expectation of life of the structural member when each is subjected to the service stress regime (or a regime "equivalent" thereto), the sensing elements before association with the structural member being pre-damaged by subjecting them to a testing stress regime "equivalent" to the service stress regime (or to a service stress regime itself) for a period such that the remaining expectation of life to failure of the most enduring of the sensing elements when subjected to the service stress regime is equal to the safe life assigned to the structural member, and the failure of the sensing elements being used to indicate the expenditure of the assigned or safe life of the structural member.

Attention is particularly directed to the fact that all the sensing elements are identical and are identically treated before association with the structural member and that there is no predetermined order of expected failure of the sensing elements. The progressive failure of the elements alerts the inspection staff responsible for the maintenance of the structure but no action is expressly called for until all the elements have failed.

Preferably the criterion of failure of a sensing element is the disappearance of strain which should otherwise be present in the element, and in this connection it is to be understood that the sensing elements are attached to the structural member while the structural member is in an unstrained condition so that when the structural member is put into service the sensing elements are strained equally therewith. To indicate failure of a sensing element using this criterion of failure a strain gauge may be associated with each sensing element, operating upon a part of the element outside the zone wherein failure will occur. All such strain gauges may further be associated with a single indicator to provide either a stage-by-stage warning of the disappearance of stress in successive elements or a warning when the stresses in all the sensing elements have disappeared. Alternatively each strain gauge may be associated with a separate indicator. The criterion of failure of a sensing element may alternatively be the interruption of an electrically conductive path through or over the element, or the operation of any other form of crack detecting device.

With regard to subsection a of the preceding statement of the nature of the invention, this condition is necessary to avoid step by step increases in the working stresses in the structural member as the sensing elements progressively fail such as would further increase the probability of failure towards the end of the assigned safe life of the member.

In further elucidation of subsection (b) of the preceding statement of the nature of the invention, the condition set forth may most readily be achieved, so far as composition and physical characteristics of the sensing elements are concerned, by making the sensing elements of portions of the same material as that of which the structural member is composed or, where the structural member is composed of more than one material, of the same material as that part of the member which experience shows to be the most likely seat of initial failure. By "initial failure" is meant the location from which failure starts, which would usually be a region of stress concentration. To preserve similarity in the effect of surface finish, at least a substantial part of the surface of each sensing element should have the same surface finish as the member. Thus for example, if the member to be supervised is a metal extrusion the sensing elements may be cut from similar extrusions, at least part of the surface of the extrusion being retained in the elements and care being taken not to subject the metal of the elements to any modifying processes such as hot or cold working or heat treatment not applied equally to the member to be supervised.

So far as configuration is concerned, this is a matter of determining the effect of the stress concentration factor of the member to be supervised on the fatigue life of the member and of providing the sensing elements with notching of such configuration that the resulting stress concentration factor has the same effect on the fatigue life of the sensing elements. This process is already well established in the art of fatigue testing and may be assisted by subjecting a model of the member to photoelastic analysis to determine the stress concentrations.

By subjecting specimens of the member to be supervised and of the sensing elements to a testing stress regime "equivalent" to the service stress regime the accuracy of matching of the expectancies of life of the members and of the sensing elements may be proved. This is preferably carried out by attaching to each of a set of specimens of the member to be supervised a number of sets of sensing elements, the elements of each set having a notching of different severity but all approximating to the notching which preliminary investigation has shown to be probably suitable. The specimens are then subjected to the equivalent testing stress regime until failure is reached in each case. An analysis of the results obtained will then show which of the sets of sensing elements has a mean life most nearly equal to the mean life of the member to be supervised. Having thus determined the configuration of the sensing elements it remains to pre-damage them by the required amount. This again can be done by attaching the sensing elements to a specimen of the member to be supervised and then subjecting the assembly to the equivalent testing stress regime for that number of test cycles corresponding to the sum of that part of the scatter range of the sensing elements above their mean life and the difference between the assigned or safe life of the member to be supervised and its mean expectancy of life. In carrying out this process it will not usually be necessary to consume one specimen of the member to be supervised for each set of sensing elements to be pre-damaged since it will generally be possible to attach more than one set of sensing elements to the member, and when these have been pre-damaged to the required extent they may be replaced by new sets, this process being repeated until the probability of failure of the specimen during the next pre-damaging run makes its further use unprofitable. These procedures have the advantage that the effect of idiosyncracies of the testing machine is eliminated from the results, but it is quite possible to carry out some or all of these procedures using different machines for operating upon the specimens of the member to be supervised and the sensing elements provided that a preliminary comparison of test results obtained by the use of the different machines is made to establish what conversion factor, if any, is necessary to equate the results given by the two machines. Final verification can also be carried out by testing specimens of the member to be supervised with pre-damaged sensing elements attached to it.

As already envisaged the pre-damaging of the sensing elements may be carried out by a service stress regime instead of by an equivalent testing stress regime. For this purpose a structural member may have associated with it when it goes into service not only a group of pre-damaged sensing elements for the purpose of giving warning of the expiration of its own assigned or safe life but also a group of undamaged sensing elements. After the structure has been subjected to the service stress regime for a period calculated to correspond to the sum of that part of the scatter range of the sensing elements above their mean life and the difference between the assigned or safe life of the structural member and the mean expectation of life of the member to failure the second-mentioned group of sensing elements is removed and these elements may be used in association with the member to be supervised of another structure which is about to go into service.

It is important to bear in mind that the service stress regime and the testing stress regime equivalent to it are individual to the service conditions to which the structure is subjected and that a warning system developed with reference to service conditions of one kind cannot be relied upon to operate with the same accuracy if the service conditions are substantially altered. Thus for example an aircraft operating mainly on transoceanic flights may well have a substantially different service stress regime from an aircraft operating mainly over mountainous trans-continental routes, and fatigue damage indicators to be used on aircraft of each service should be individual to that service. Occasional changes in service conditions, affecting only a small percentage of the total life, would not normally have an appreciable effect upon the operation of the device, but where a predominating service condition cannot be forecast it will be desirable to select, for the purpose of carrying out the invention, a testing stress regime which is equivalent to an average of the possible service regimes. In such a case the average probability of failure in a group of structures remains at a desirably low figure while individuals may through fortuitous circumstances be subjected to slightly higher or slightly lower risks. These risks can be assessed statistically and it will be, as at present, a matter of agreement between manufacturer, user and registration authority as to what risks are acceptable.

The sensing elements may conveniently be nine in number for each member to be supervised and of flat plate formation with a "waisted" portion which constitutes the active part of the element, as is usual with test specimens. The waisted portion is furthermore provided with a more or less acute notch as necessary to match the effect of stress concentration in the element to that of the stress concentrations in the member to be supervised and the elements are conveniently attached to the member by their larger flat end portions by means of a thermosetting adhesive, solder or other suitable means not affecting the physical characteristics of the member and the elements. Where a strain gauge is used for signalling failure of an element the strain gauge may also be attached to the element by means of a thermosetting adhesive. The strain gauge should not bridge the notched portion. Where failure is to be indicated by the interruption of an electrically conductive path this path may take the form of a narrow band of conductive material upon a coating of insulating material applied to the surface of the element in this case so that the band of conductive material bridges the notch. Thus for example an electrically conductive line may be drawn by means of a graphite pencil upon thin paper stuck to the surface of the element. Since in a member to be supervised conditions of equal strain will normally be present over a substantial area of the surface of the member no difficulty will usually be experienced in finding space for the attachment of the desired number of sensing elements.

In the case of an aircraft, electrical connections from the strain gauges or crack detectors may be taken to connection terminals at some convenient point adjacent a group of members to be supervised so that during maintenance inspection an indicator may be applied in turn to the pairs of terminals pertaining to the different sensing elements to determine which ones have failed. Preferably however, all the sensing elements are wired to indicators at the Flight Engineer's or the Pilot's station since this will make it possible to record the circumstances under which failures take place and thus provide valuable data concerning conditions in which fatigue failure is most probable. Where, in such a system, strain gauges are used in association with a structural member which normally passes periodically through zero strain, delay action or other suitable means are preferably included to prevent transient zero strain conditions being indicated.

Figure 2:
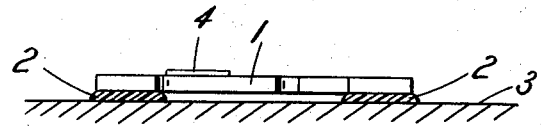

The invention is illustrated by way of example in the attached drawing. Figures 1 and 2 of the drawing show in side and plan view respectively a sensing element 1 attached by adhesive 2 to the surface 3 of a structural member to be supervised. The element has a strain gauge 4 stuck to its surface as already described, and is notched at 5.

Figure 3:
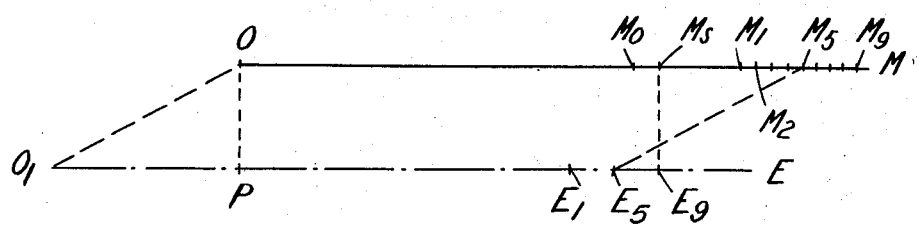

Figure 3 is an endurance diagram not to scale, in which the endurances in testing cycles to failure of nine specimens of the member to be supervised are plotted along the line OM, the endurance of the first to fail being $OM_1$, that of the second $OM_2$, and so on up to $OM_9$. The point $M_5$ in this scatter range of this scatter represents the mean expectation of life of the member to be supervised. The probability of failure of such a member at $OM_1$ cycles is one in nine, which is obviously too high a risk to be accepted. By extrapolation methods a number of cycles $OM_0$ can be found which involves zero probability of failure, but having regard to other risks necessarily run concurrently it is frequently not justifiable to limit the usable life of the member to this value, and a higher life such as $OM_s$ is assigned to the member as its safe life. The sensing elements provided according to this invention are accordingly pre-damaged to make the remaining expectation of life of the most enduring of them equal to $OM_s$. For convenience in the diagram the endurances of the sensing elements are plotted along a line $O_1E$ parallel to the line OM, and since, if there are nine elements failure of the ninth, represented by a point $E_9$ on the line $O_1E$ is to correspond to the point $M_s$ on the line OM, the point $E_9$ is plotted immediately below $M_s$. Plotting the endurances of the other sensing elements on the line $O_1E$ gives the scatter range $E_1$ to $E_9$, and the point $E_5$ corresponding to the end of the mean life of the elements. The position of the point $O_1$ is thus determined since the mean life $O_1E_5$ of the elements is equal to the mean expectation of life $OM_5$ of the structural member to be supervised. If P is the point on $O_1E$ immediately below O, $O_1P$ represents the number of test cycles to which the sensing elements should be subjected during the pre-damaging process, and this is clearly equal to $$OM_5 - OM_s + O_1E_9 - O_1E_5$$

namely the sum of the number of test cycles corresponding to the difference between the mean expectation of life of the structural member and the assigned safe life and the number of test cycles corresponding to that part of the scatter range of the sensing elements above their mean life.

In exceptional cases where $OM_5$ cannot be made equal to $O_1E_5$ the sensing elements should be subjected to a pre-damage equal to $O_1E_9 - OM_s$.

I claim:

1. A method of providing an indication of the expiration of the assigned or safe life of a structural member, which method comprises making a sufficient number of identical sensing elements to cover adequately the pre-established scatter of endurances to failure of such sensing elements when subjected to a testing stress regime "equivalent" to a service stress regime applicable to the structure of which the member forms a part, said sensing elements being of insufficient total load carrying capacity to reduce appreciably the working stresses in the structural member, when they are attached thereto, and of such composition, configuration and physical characteristics as to have a mean expectation of life substantially equal to the mean expectation of life of the structural member when each is subjected to the service stress regime or a regime "equivalent" thereto, pre-damaging the sensing elements by subjecting them to a testing stress regime which subjects said elements to stresses of the magnitude, intensity and frequency encountered by the structural member in service for a period such that the remaining expectation of life to failure of the most enduring of the sensing elements when subjected to the service stress regime is equal to the assigned or safe life of the structural member, and then attaching said sensing elements to the structural member so that each will be equally strained therewith when the structural member is put in service, the failure of the sensing elements being used to indicate the expenditure of the assigned or safe life of the structural member.

2. A method as claimed in claim 1, wherein the sensing elements are pre-damaged by subjecting them to said testing stress regime for that number of test cycles corresponding to the sum of that part of the scatter range of the sensing elements above their mean life and the difference between the safe or assigned life of said structural member and its mean expectancy of life.

3. A method as claimed in claim 1, wherein the sensing elements are pre-damaged by subjecting them to said testing stress regime for that number of test cycles corresponding to the endurance in testing cycles of the most enduring of the sensing elements less the number of test cycles corresponding to the safe or assigned life of said structural member.

4. A method as claimed in claim 2, wherein the sensing elements are pre-damaged by attaching them to a specimen of said structural member to form an assembly and then subjecting the assembly to the testing stress regime.

5. A method as claimed in claim 1, wherein not less than nine sensing elements are employed.

6. A method as claimed in claim 1, wherein the structural member is composed of more than one material, the method further comprising making the sensing elements of the same material as that part of the structural member which is the most likely seat of initial failure.

7. A method as claimed in claim 3, wherein the sensing elements are pre-damaged by attaching them to a specimen of said structural member to form an assembly and then subjecting the assembly to the testing stress regime.

References Cited in the file of this patent

UNITED STATES PATENTS

| 2,099,725 | De Forrest | Nov. 23, 1937 |
| 2,486,625 | Allen | Nov. 1, 1949 |

FOREIGN PATENTS

| 716,572 | Great Britain | Oct. 6, 1954 |

OTHER REFERENCES

Fatigue and Fracture of Metals (edited by W. M. Murray), published by John Wiley and Sons, Inc. (New York) (pp. 37, 38, 39 pertinent).